United States Patent [19]

Chenoweth

[11] 4,174,667
[45] * Nov. 20, 1979

[54] RAIL DRAFT VEHICLE EMPLOYING TRACTOR-LIKE APPARATUS

[76] Inventor: Charles E. Chenoweth, 3606 N. 30th Ter., Topeka, Kans. 66614

[*] Notice: The portion of the term of this patent subsequent to May 2, 1995, has been disclaimed.

[21] Appl. No.: 856,001

[22] Filed: Nov. 30, 1977

Related U.S. Application Data

[63] Continuation-in-part of Ser. No. 726,987, Sep. 27, 1976, Pat. No. 4,086,856.

[51] Int. Cl.² .............................................. B60F 1/04
[52] U.S. Cl. .............................. 105/26 R; 105/215 C
[58] Field of Search ................ 105/215, 177; 280/402, 280/408, 414 R; 105/26 R, 90 A, 21

[56] References Cited

U.S. PATENT DOCUMENTS

| Re. 25,495 | 12/1963 | Söyland et al. | 214/138 R |
|---|---|---|---|
| 3,022,744 | 2/1962 | Jackson | 105/215 C |
| 3,235,109 | 2/1966 | Weaver | 214/674 |
| 3,874,306 | 4/1975 | Coon et al. | 105/26 R |
| 4,086,856 | 5/1978 | Chenoweth | 105/1 A |

Primary Examiner—Stephen G. Kunin
Assistant Examiner—Frank F. Atwood
Attorney, Agent, or Firm—Schmidt, Johnson, Hovey & Williams

[57] ABSTRACT

A rail-draft vehicle employs an ordinary tractor-like apparatus having conventional forwardly extending, boom apparatus and intermediate vehicle means interposed between the tractor-like apparatus and a conventional railroad car for coupling with and moving one or more of the latter along the rails. The boom apparatus is of the type having a pair of power operated, spaced, swingable tool supporting arms extendable to a position substantially forward of the tractor and have mounted thereon a pair of rail wheels which may be selectively lowered into engagement with the rails upon manipulation of the loader attachment, thereby eliminating the need for special rail wheel retracting mechanisms heretofore directly mounted on the tractor. The intermediate vehicle has opposite ends thereof respectively coupled with the three point hitch of the tractor and the railway coupling mechanism of the railroad car, and is provided with a pair of rail wheels which, in combination with the front rail wheels associated with the boom apparatus, provide long wheelbase mounting of the tractor on the rails in a manner to allow highly stabilized operation of the rail-draft vehicle. A compressed air supply for controlling the braking system of the railroad cars is mounted on the tool supporting arms adjacent the forward set of rail wheels in order to improve the weight distribution of the vehicle and thereby further increase operating stability.

3 Claims, 2 Drawing Figures

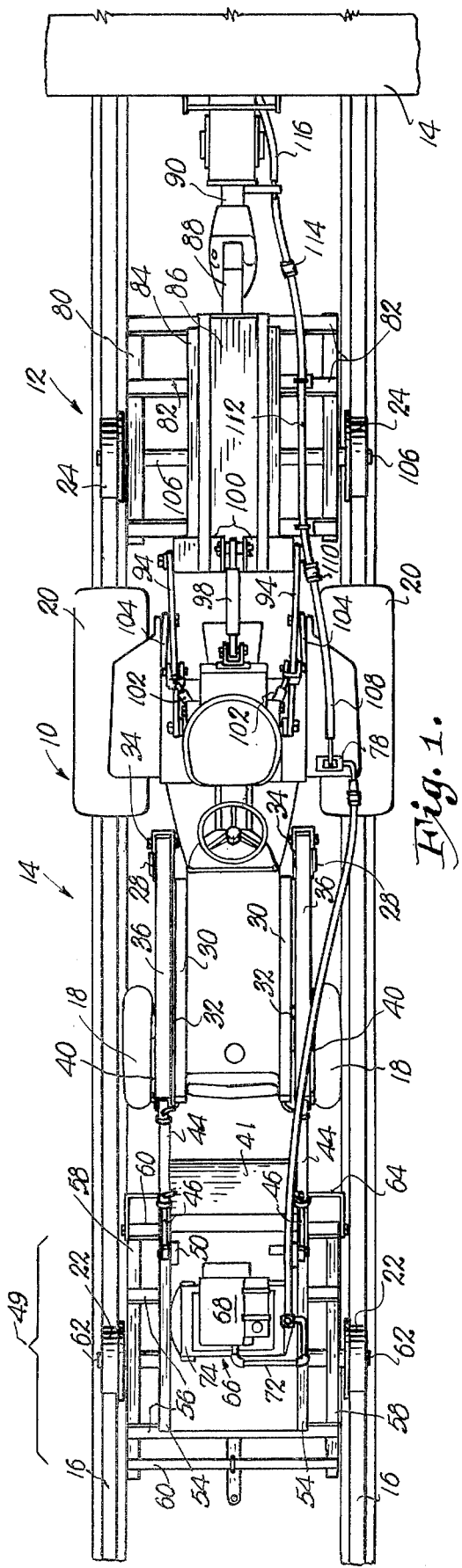

RAIL DRAFT VEHICLE EMPLOYING TRACTOR-LIKE APPARATUS

RELATED CO-PENDING APPLICATION

This Application is a Continuation-In-Part of my co-pending Application Ser. No. 726,987 filed Sept. 27, 1976, now U.S. Pat. No. 4,086,856 issued May 2, 1978.

BACKGROUND AND BRIEF DESCRIPTION OF THE INVENTION

This invention generally relates to rail-draft apparatus and deals more particularly with improved apparatus for adapting tractor-like draft vehicles for coupling with ordinary railroad cars to allow movement of the latter along the rails.

The present invention represents certain important improvements in the apparatus disclosed in my above-mentioned, prior, co-pending application, wherein novel means were disclosed for intercoupling a tractor or the like with an ordinary railroad car to allow movement of a number of the latter along a set of rails, and constructional details of certain portions of the present invention may be more fully understood by reference to my mentioned prior application. In the arrangement disclosed in my prior application, a tractor or like vehicle was fitted with specially configured, retractable rail wheel mechanisms at the front and rear thereof which were operative to selectively lower rail wheels into engagement with the rails for supporting the tractor on the rails. Although these rail wheel mechanisms were entirely suitable for the intended purpose, such mechanisms are rather structurally complex and are relatively expensive. The present invention not only eliminates the need for these specially configured rail wheel mechanisms but also eliminates the need for one set of rail wheels at the rear of the tractor, while at the same time providing rail wheel mounting of the tractor in a manner to improve the vehicle's weight distribution and operating stability.

According to the present invention, a tractor-like vehicle is operably coupled with an ordinary railroad car by means of a rail travelling intermediate vehicle having conventional railroad-type coupling means on one end thereof and tractor-type coupling means on the opposite end thereof for respectively coupling with the railroad car's coupling means and a conventional three point hitch of the tractor vehicle. The tractor is provided with conventional power operated, forwardly extending, boom apparatus of the well known type to which, in this invention there is attached structure for mounting thereon a pair of tractor supporting rail wheels and a compressed air supply for control of the railroad cars' braking system. Both the three point hitch and the boom apparatus may be selectively energized to elevationally retract the front and rear rail wheels respectively associated with the mentioned mounting structure and the intermediate vehicle to allow the tractor vehicle to leave the rails and travel over the ground from one set of rails to another.

A primary object of the invention is to provide a particularly economical and effective means for moving a number of railroad cars short distances along the rails, especially for the purposes of loading, switching, and spotting of the cars.

Another object of the invention is to provide unique apparatus for operably intercoupling a rail draft vehicle with a number of railroad cars for movement of the latter along the rails, wherein there is provided means for controlling the air braking system of the railroad cars to be moved, thus allowing safe, reliable transport of the railroad cars.

A further object of the invention is to provide a rail-draft vehicle of the mentioned type wherein the rail engaging wheels thereof are substantially longitudinally spaced apart, in order to provide long wheelbase mounting of the rail-draft vehicle whereby to provide highly stable operation thereof along the rails.

A still further object of the present invention is to provide a rail-draft vehicle of the mentioned type employing a tractor or like vehicle having conventional, forwardly extending, boom apparatus mounted thereon provided with a pair of spaced apart, swingable supporting arm members which may be selectively manipulated by a tractor operator, wherein rail wheel means are operably coupled to the support arms in a manner to allow a pair of rail wheels to be selectively shifted into and out of engagement of the rails.

Another object of the present invention is to provide a rail-draft vehicle of the mentioned type wherein intermediate vehicle means having a pair of rail wheels mounted thereon is operably coupled between the draft vehicle and a conventional railroad car to be moved and functions to guide and at least partially support one extremity of the rail-draft vehicle on the rails.

Other and further objects of the invention will be made clear or become apparant in the course of the following description of a preferred embodiment of the invention.

DETAILED DESCRIPTION OF THE INVENTION

In the drawings:

FIG. 1 is a plan view of a preferred embodiment of the invention, shown in operative relationship to a pair of rails and a portion of one of a number of railroad cars to be coupled with, for movement thereof along the rails; and FIG. 2 is a side elevational view of the rail-draft vehicle shown in FIG. 1.

Referring now to the drawing, an ordinary tractor or like vehicle 10 is operably coupled by means of an intermediate vehicle 12 to a railroad car 14 in order to allow movement of the latter along a set of conventional, laterally spaced railroad tracks or rails 16. The tractor 10 includes a pair of ground-engaging, front steerable wheels 18 and a pair of ground-engaging, rear driving wheels 20 for normally propelling the tractor 10 along the ground in the normal manner, the rear wheels 20 having been adapted to be spaced apart a distance corresponding to the spacing of rails 16, in order that the rear wheels 20 may rest upon the rails 16 and frictionally engage the latter to allow propulsion of the rail-draft vehicle along the rails 16. The rail-draft vehicle is adapted for travel along the rails 16 by means of a front pair of railroad-type rail-engaging wheels 22 and a rear pair of such wheels 24 which support, guide and stablize the tractor 10 on the rails 16 by means of a novel structural combination which will now be discussed in more detail.

The tractor 10 is provided with power operated, elevationally swingable, forwardly extending boom apparatus generally indicated by the numeral 26 of the conventional type which is in widespread use, is commonly referred to as a "front end loader boom", is typically retrofitted to the tractor 10 as an accessory or attachment to the latter, and is normally utilized for releasably coupling with any of a variety of accessories in order to manipulate the latter for performing miscellaneous tasks such as hay bale handling, loading, shoveling, etc. The boom apparatus 26 comprises a pair of spaced, upright support members 28 on each side of central stretches of the tractor 10, each having the lower end thereof secured to frame portions of the tractor 10 as by welding, while middle portions of each of the support members 28 are secured to the tractor 10 by means of longitudinally extending framework 30, which framework is in turn fastened to the tractor 10 as by bolting through brackets 32. The upper extremity of each support member 28 includes a clevis and pin combination 34 for hingedly mounting one extremity of an associated extension arm 36 thereon, the opposite extremity of arm 36 being connected to the rearward end of the angularly offset tool supporting arm 38 by means of connecting plate 40, which plate 40 is made fast to arms 36 and 38 as by welding whereby to form a rigid, longitudinally extending structure swingable about a laterally extending, essentially horizontal axis through the upper extremity of upright support members 28. A cross brace 41 extends transversely between arms 38 and is made fast to each of the latter to assure that the forward extremities of arms 38 are held in fixed relationship to each other. Hydraulically operated, extendable cylinder members 42 each have the opposite ends thereof respectively connected to a corresponding connecting plate 40 and a mounting flange 43 depending from central portions of the associated support member 28, and is selectively actuatable by an operator of the tractor 10 for swinging each pair of the arms 36 and 38 about the upper extremity of the corresponding support member 28. Hydraulically operated cylinder members 44 each have one end thereof also secured to the corresponding connecting plate 40 while the other end thereof, which comprises the extendable rod element 46, is spaced above the forward extremity of the associated tool supporting arm 38, and is normally adapted to be pivotally coupled at a first mounting point to a tool-like accessory attachment (not shown), the forward extremity of each of the tool support arms 38 being pivotally attached by coupling means such as a laterally extending shaft or pin 48 to provide a second mounting point of the implement attachment to the boom apparatus 26. Thus, it can be appreciated that an accessory attachment (not shown) is ordinarily connected to the boom apparatus 26 by coupling means 48 for pivotal movement about the latter upon actuation of the cylinder member 44.

Rail wheel carrying means generally designated by the numeral 49 includes laterally spaced upright mounting elements 50 secured to transversely extending structure herein shown as a generally rectangularly shaped, wheel frame 52 and platform 54 mounted thereon via transversely extending angle iron members 56. Wheel frame 52 comprises a pair of spaced, longitudinally extending members 58 joined together by transversely extending connecting elements 60 to form a rigid structural unit. A transversely extending wheel axle 62 is rotatably mounted on members 58 and has one of the rail wheels 22 mounted on opposite ends thereof. A transversely extending U-shaped support leg 64 is mounted on the rear extremity of the rear frame 52 for swinging movement about a transverse axis for purposes which will become later apparent. A compressed air supply means generally indicated by the numeral 66 is mounted on the platform structure 54 and comprises an air compressor 68 driven by a suitable power source such as a gasoline motor 70, and is operably coupled via air line 72 to the compressed air reservoir tank 74, tank 74 in turn being operably coupled by flexible air line 46 to a three position, operator actuated, brake control valve 78.

The intermediate vehicle means 12 comprises a wheel frame 80, similar in construction to wheel frame 52, and has mounted thereon via transversely extending angle iron members 82, a horizontally extending mounting plate 84. A longitudinally extending, generally hollow metal housing of essentially square cross section is secured atop the plate 84 as by bolting, and has mounted therewithin a portion of a conventional railway type coupling means 86 comprising an ordinary draft gear assembly (not shown) and including a draft bar 88 extending longitudinally rearward therefrom. Draft vehicle draft bar 88 includes on the rear extremity thereof a conventional railway type knuckle coupler which is adapted to matingly engage a like coupler associated with the draft bar 90 of the railroad car 14. The forward end of intermediate vehicle means 12 is operably coupled to the three point hitch generally indicated by the numeral 92 of the tractor 10. The three point tractor hitch 92 comprises: a pair of laterally spaced, power links 94 each having the opposite ends thereof respectively connected to the frame of the tractor 10 and a mounting ear 96 depending from the forward extremity of intermediate vehicle means 12; a longitudinally extending, centrally aligned, swingable stabilizer link 98 having opposite ends thereof respectively pivotally connected to the frame of the tractor 10 and an upstanding, bifurcated member 100 secured to the forward extremity of the intermediate means 12, and more particularly to the housing 86; and, a pair of hydraulically actuated, extendable cylinder members 102, each having the opposite ends thereof respectively pivotally connected to frame portions of the tractor 10 and central stretches of the power links 94. A stabilizer element 104 has been provided for each of the power links 94, and has the opposite ends thereof respectively pivotally connected to frame portions of the tractor 10 and central stretches of the power links 94, such stabilizer elements providing additional lateral stability for the power links 94. The intermediate vehicle means 12 is supported upon the rails 16 by means of a pair of spaced, rail engaging wheels 24 which are secured on opposite ends of a rail wheel shaft 106 rotatably mounted on the wheel frame 80. The three position brake valve 78 is operably connected with the air controlled braking system of the railroad car 14 by means of air line 108, quick disconnect coupling 110, air line 112 which is suitably secured to the intermediate vehicle means 12, quick disconnect coupling 114, and finally, railroad car air brake hose 116.

In operation, with the rail-draft vehicle in its operative position on the rails 16, the tractor 10 is supported and guided adjacent the forward extremity thereof by the front rail wheels 22 which are spaced a substantial distance forward of the tractor 10 itself while the rear rail wheels 24 which are spaced substantially to the rear of the tractor 10 allow long wheelbase rail mounting of the tractor 10 to provide exceptional tracking stability in the direction of travel which substantially reduces the likelihood of accidental derailment due to unevenness of the rails 16, impediments in the ground adjacent the rails especially on railroad crossings, and other minor foreign obstacles in the path of the rail travel. In spite of the fact that the front and rear rail wheels 22 and 24 are respectively longitudinally spaced from corresponding opposite ends of the tractor 10, the rail wheel axles 62 and 106 are held in substantial parallelism with each other due to the laterally stability provided by novel structural features of the invention; the front rail wheel axle 62 is maintained in a constant attitude by virtue of the simple, but particularly rigid structure provided by the boom apparatus 26, while the rear rail wheel axle 106 is likewise held in a constant lateral attitude by virtue of the drive links 94 which are reinforced by the stabilizing elements 104. It is also important to note that the mounting of the compressed air supply means 66 at a forward position adjacent the front rail wheels 22 serves to impose a portion of the vehicle's weight on the latter; by this feature of the invention the overall weight distribution of the vehicle is improved and the tendency of the front rail wheels 22 to leave the rails 16 under adverse track conditions is minimized.

The actual operation of the rail-draft vehicle in moving along the rails 16 and coupling and uncoupling with one or more railroad cars 14 for the purpose of moving the latter along the rails is essentially similar to that described in my previously mentioned co-pending application; the driving wheels 20 frictionally engage the rails 16 and propel the rail draft vehicle and railroad car 14 coupled therewith along the rails, with the rail wheels 22 and 24 supporting at least a portion of the weight of the entire rail-draft vehicle and functioning to guide and maintain the same on the rails 16. The three-way valve 78 may be selectively actuated by the tractor operator to control the brakes of the railroad car 14 as desired. In order to transport the rail-draft vehicle from one set of rails to another, the knuckle coupling mechanism associated with draft bars 88 and 90 is first manually uncoupled and the air line 116 is disconnected from air line 112 by uncoupling the quick disconnect mechanism 114, thereby uncoupling the railroad car 114 from the rail-draft vehicle. The tractor operator may then actuate the three point hitch 92 of the tractor 10 thereby retracting cylinder members 102 to cause the power links 94 to raise the intermediate vehicle means 12, and thereby elevate the rear rail wheels 24 out of engagement with the rails 16. The tractor operator may then actuate the cylinder member 42 whereupon extension arms 36 along with tool supporting arms 38 are caused to be elevated, in turn raising the wheel frame 52 and thus the rail wheels 22 out of engagement with the rail 16 while simultaneously lowering the forward extremity of the tractor 10 and the steerable wheels 18 into engagement with the ground, between the rails 16. At this point, with the rail wheels 22 and 24 elevated in clearing relationship to the rails 16 the tractor 10 may then be operated in the normal manner and driven across the ground to another set of rails. Upon reaching an alternate set of rails, the tractor is driven onto the rails forward of a railroad car 14 to be moved, with the rear driving wheels 20 of the tractor 10 positioned in superimposed engagement with the rails 16. With the rail-draft vehicle substantially longitudinally aligned between the rails 16, the tractor operator may then actuate cylinder members 102 to cause the intermediate vehicle means 12 to descend so that rear rail wheels 24 engage the rails 16. The cylinder members 42 may then be actuated to lower the boom apparatus, and more particularly the wheel frame 52 so that the front rail wheels 22 are brought into engagement with the rails 16 whereupon the forward end of the tractor 10 is then elevated and the front steerable wheels 18 are retracted off the ground.

In the event that it is desired to use the tractor 10 for purposes other than moving railroad cars, the rail wheel carrying means 49 may be simply uncoupled from the boom apparatus 26 by unfastening the shafts 48 and rods 46 from the support elements 50 and disconnecting air line 76 from valve 78 whereupon support leg 64 may be swung downwardly into engagement with the ground to support the railway carrying means 49 on the ground and prevent the same pivoting about the axle 62.

It will be observed that my improved apparatus not only provides for the reliable accomplishment of the object of the invention, but does so in a relatively simple and economical manner. It is recognized, of course, that those skilled in the art may make various modifications or additions to the preferred embodiment chosen to illustrate the invention without the departing from the gist and essence of my contribution to the art. Accordingly, it is to be understood that the protection sought and to be afforded hereby should be deemed to extend to the subject matter claimed and other equivalents thereof fairly within the scope of the invention.

I claim:

1. A rail draft vehicle assembly adapted both for travel along conventional railway-type rails to move a number of railroad cars of the kind having a conventional railway-type mechanical coupling mechanism at each end thereof and for travel along the ground between positions of desired operation of said assembly for moving railroad cars upon said rails, said assembly comprising:

a conventional tractor having steerable front wheel means and a pair of rear driving wheels for ordinarily supporting and propelling said tractor for travel along the ground, said tractor being provided with power operated, elevationally swingable, mechanical coupling means on the rear thereof;

a conventional tractor-type, power operated, elevationally swingable, boom apparatus on said tractor and extending forwardly therefrom, said boom apparatus being provided with mechanical coupling means on the forward extremity thereof;

a forward wheeled unit including frame structure and a first pair of rail wheels rotatably mounted on said frame structure and arranged for engaging said rails, said forward wheeled unit being provided with mechanical coupling means on said frame structure, cooperable with said coupling means on said boom apparatus and coupled with the latter for cantilever mounting said forward wheeled unit on said boom apparatus;

an intermediate vehicle unit adapted to be disposed between the rear of said tractor and one of said railroad cars for intercoupling the former with the latter, said intermediate vehicle unit including frame means and a second pair of rail wheels rotatably mounted on said frame means and arranged for engaging said rails, said intermediate vehicle unit being provided with mechanical coupling means on the front of said frame means, cooperable with said coupling means on the rear of said tractor and coupled with the latter for cantilever mounting said intermediate vehicle unit on said tractor, and with conventional railway-type mechanical coupling means on the rear of said frame means, cooperable with said conventional railway-type mechanical coupling means on the said one railroad car and adapted for coupling with the latter, said first and second pairs of rail wheels being movable into engagement with said rails for guiding said draft vehicle assembly along said rails responsive to lowering of said boom apparatus and said coupling means on the rear of said tractor and movable out of engagement with said rails and the ground for permitting off-rail operation of said draft vehicle assembly responsive to raising of said boom apparatus and said coupling means on the rear of said tractor.

2. The invention of claim 1 wherein said rear driving wheels of said tractor are laterally spaced from each other a distance for disposing said drive wheels for riding upon said rails when said draft vehicle assembly is being operated to move railroad cars along said rails.

3. The invention of claim 2, wherein said boom apparatus and forward wheeled unit are operable, responsive to lowering of said boom apparatus relative to said tractor in amount greater than required to bring said first pair of rail wheels into initial engagement with said rails when said draft vehicle assembly is being operated upon said rails, to lift said steerable front wheel means of said tractor away from engagement with the ground and to thereby concentrate the weight of said tractor upon its rear driving wheels for increasing the traction of the latter with said rails.

* * * * *